By# UNITED STATES PATENT OFFICE.

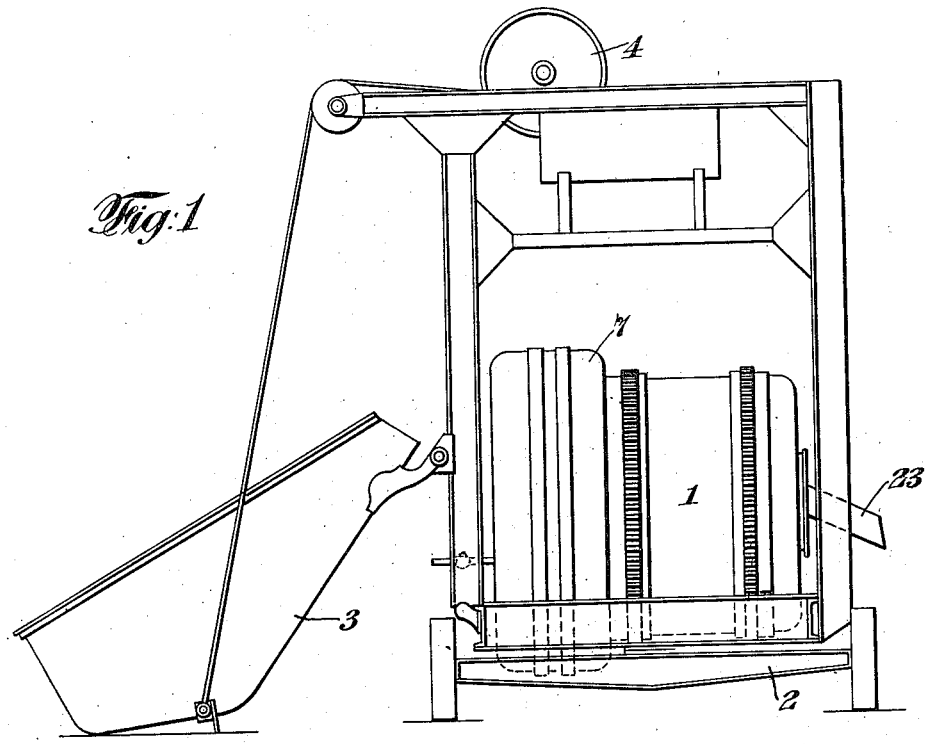
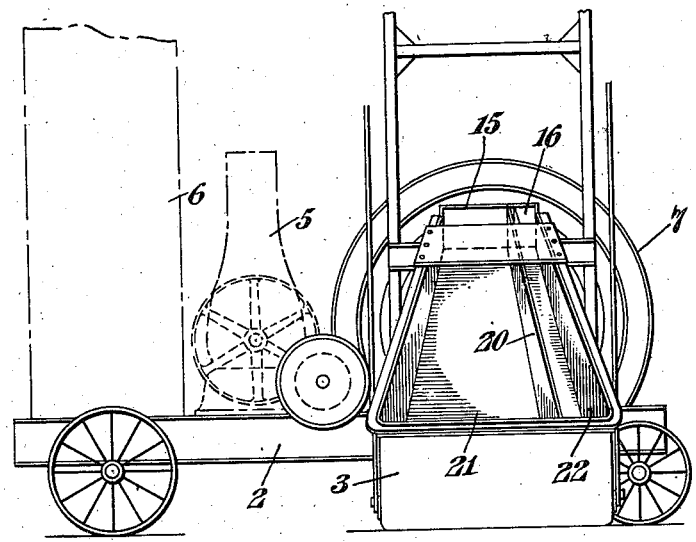

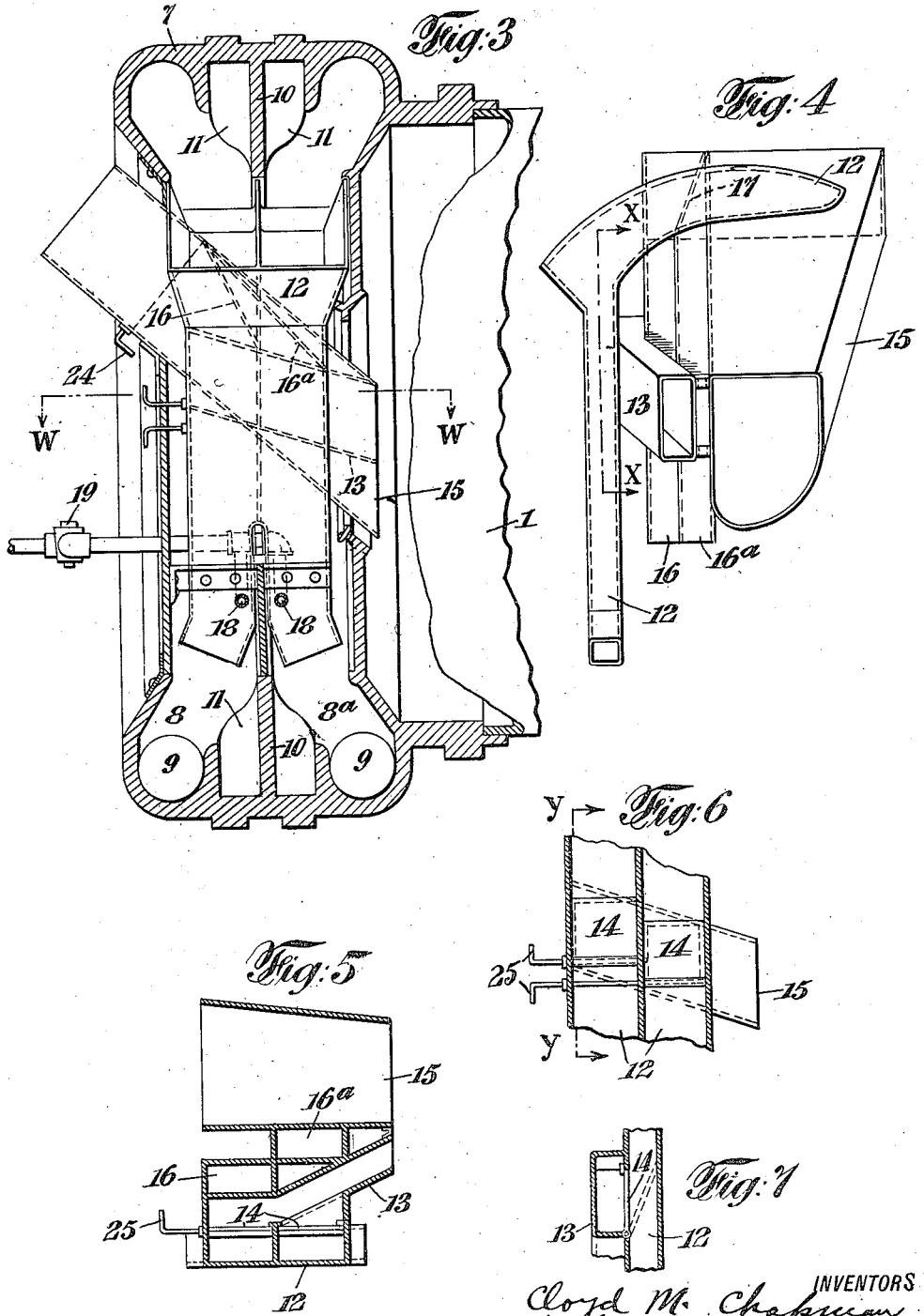

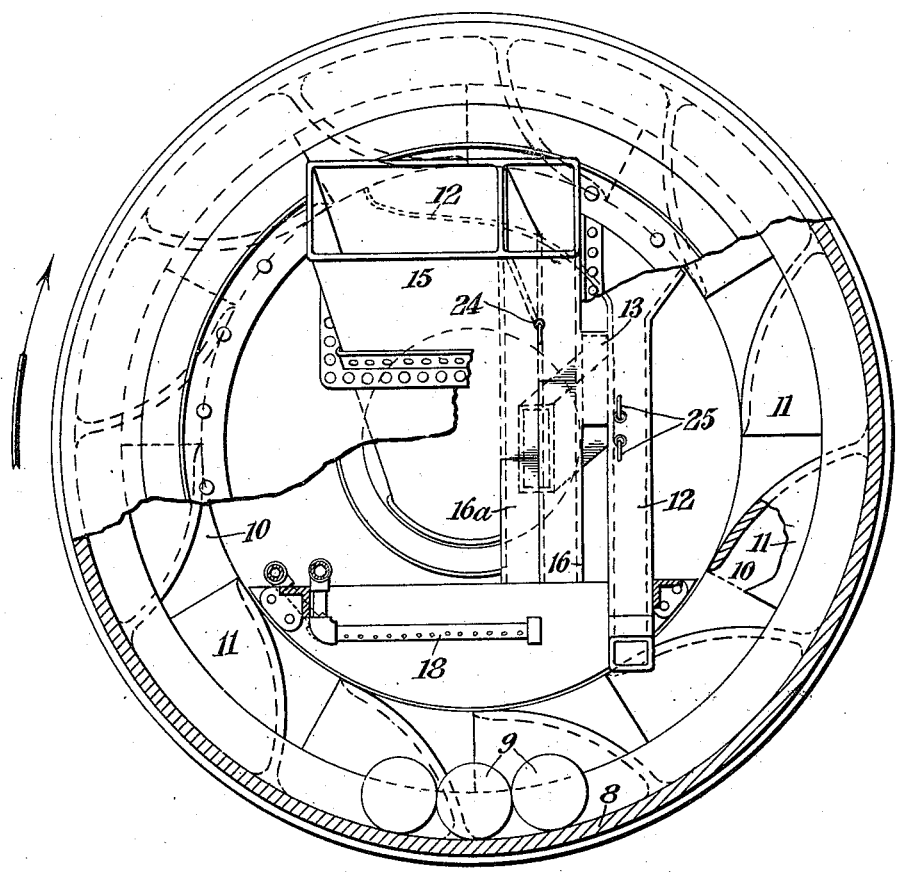

CLOYD M. CHAPMAN, OF DOUGLASTON, NEW YORK, AND NATHAN C. JOHNSON, OF ENGLEWOOD, NEW JERSEY; SAID CHAPMAN ASSIGNOR TO SAID JOHNSON.

METHOD OF AND APPARATUS FOR MAKING CONCRETE.

1,259,461. Specification of Letters Patent. Patented Mar. 12, 1918.

Application filed February 23, 1917. Serial No. 150,366.

*To all whom it may concern:*

Be it known that we, CLOYD M. CHAPMAN, a citizen of the United States, and a resident of Douglaston, county of Queens, and State of New York, and NATHAN C. JOHNSON, a citizen of the United States, and a resident of Englewood, county of Bergen, and State of New Jersey, have invented certain new and useful Improvements in Methods of and Apparatus for Making Concrete, of which the following is a specification.

Our invention relates to improvements in methods of and apparatus for making concrete; the term "concrete" being used to include a mixture of cement and water with any suitable aggregate or aggregates, such for example as sand or sand and stone, etc., except where hereinafter more specifically limited.

The invention provides for substantial hydration of the cement prior to its being mixed with the aggregate or aggregates forming the other ingredients of the concrete; and for the carrying out of this preliminary hydration of the cement in separate batches, one batch being hydrated in alternation with another, so that the mixing of the water and cement of one batch is continued to hydrate the cement of that batch while another charge or batch of cement and water is being formed, and for mixing such batches of hydrated cement so formed, successively, with successive quantities of the coarser ingredients or aggregates used to form the concrete.

In the making of concrete it is an economic essential that a substantial output shall be had in a short time, and with the present processes and apparatus for mixing concrete, a sufficient opportunity is not given for a thorough mixing of the cement and water to obtain the desired amount of hydration of the cement. The period of such mixing in commercial work rarely exceeds thirty seconds, because in the endeavor to produce the required amount of concrete in a given time the mixing operation is necessarily brief; and even if a much longer time than this were allowed for the mixing of the combined ingredients of the concrete, the cement would not be as thoroughly hydrated as it will be when treated by and according to the preferred means and manner of carrying out our invention. This is due to the fact that in present mixing processes, a portion of the cement becomes pocketed in, or between, or adheres to, the particles of aggregate, sometimes in lumps and sometimes in films, thus preventing ready and thorough intermingling of the individual particles of the cement with the water, and because the coarser particles prevent certain breaking up of any small lumps of cement.

Because of these difficulties, cement in concrete heretofore has not been well hydrated. In other words, the present methods and apparatus for mixing concrete result in a very inefficient use of the cement and in an inefficient, inferior and impermanent product.

In the making of concrete the most important consideration is that a thorough hydration of the cement be secured, and the consideration of next importance is the time and cost of mixing the concrete. We have found that to obtain the desired hydration there must be forcible and thorough mixing of the cement particles with the water, and that the desired degree and character of mixing is difficult, if not impossible to attain in present practice within a reasonable time once the coarser aggregate or aggregates, such as broken stone, are mixed with the cement, because of interference with the free intermingling of the individual particles of the cement with the water, as heretofore mentioned.

Broadly stated, the object of this invention is to obtain a stronger and more coherent concrete with regard to the rate of output of the same.

As a method, our invention in its broader aspect comprises the substantial hydration of separate batches of cement in alternation, with or without the finer aggregates such as sand mixed therewith, this hydration taking place prior to the cement being mixed with the coarser aggregates such for example as broken stone, and being carried on so that the mixing of the water and cement of one batch is continued to hydrate the cement of that batch while a similar batch or charge is being formed to be hydrated, and mixing such batches of hydrated cement so formed, successively with successive quantities of the coarser aggregate or ingredients of the concrete such as broken stone. In its broader aspect, as a method the invention also comprises the alternate substantial hydration of separate batches of cement, which hydrated batches are successively mixed with the finer aggregate only, such as sand, to form what is more specifically known as mortar or grout, but which comes under the broad heading of concrete. But the full benefits of the invention are only obtained by the preferred and more complete manner of carrying out the invention, which comprises the substantial hydration of the separate batches of cement in alternation prior to its being mixed with any coarser particles, and the mixing of the successive hydrated batches of cement with the other ingredients of the concrete as described.

As an apparatus our invention comprises mixing means (which may be of ordinary type) provided with a plurality of cement-hydrating means adapted to be charged with cement and water in alternation and to be caused to discharge their contents in alternation into said mixing means. As an apparatus our invention also comprises various other features hereinafter described and pointed out in the appended claims.

In the mixer herein illustrated and described, means are provided for the preliminary hydration of the cement and subsequent coating of the stone or gravel and sand or other aggregates with such hydrated cement. The particular means employed for the preliminary hydrating of the cement shown in the drawings is a double ball mill. In this new mixer by alternate charge and discharge of the two ball mills constituting the cement-hydrating means, the customary output of concrete is not cut down, but with delivery of one batch of concrete each minute, which is a desirable commercial rate, each batch of cement is given approximately two minutes of very thorough incorporation with the water by means of the ball mills, so that the cement is well hydrated. Further, the whole mechanism is simple and rugged.

More specifically stated, the objects of the invention are, to provide, for the hydration of the cement, a longer period of time than is employed in the subsequent mixing of the hydrated cement with other constituents of the concrete; to insure very thorough and uniform hydration of the cement; to provide simple and easily constructed apparatus wherein the hydration of the cement may be conducted independent of, and prior to, the mixture of the cement with other ingredients of the concrete; to provide simple apparatus wherein a plurality of batches of cement may be hydrated separately and in alternation, and then added to other ingredients to form the concrete; to provide simple and effective means for mixing the cement and water thoroughly and uniformly, and in a very short space of time, with avoidance of lumps; to provide simple and effective means whereby a greater interval of time is available for the mixing of the cement and water than is required for the subsequent coating of the aggregates with the hydrated cement, and this without interference with the continuous operation of the portion of the apparatus wherein the other ingredients of the concrete are coated with the hydrated cement; and generally to make the apparatus simple, easily operated, highly efficient, and but little more expensive than the ordinary concrete mixer of present commercial type.

Further objects and advantages of the invention will more fully appear from the following description taken in connection with the accompanying drawings illustrating one embodiment of the apparatus feature of our invention, and which is one form of apparatus for carrying out the method feature of the invention.

We will now proceed to describe our invention with reference to the accompanying drawings illustrating one type of apparatus adapted for carrying out the method portion of our invention, and constituting one embodiment of the apparatus portion of our invention.

In said drawings,

Figure 1 shows an end view of a concrete mixing device embodying our invention, mounted upon a suitable truck and provided with means for charging the mixer;

Fig. 2 shows a side elevation of the same apparatus;

Fig. 3 shows a longitudinal vertical section through the axis of the mixer drum, this view showing particularly the double ball mill comprising the preliminary mixer or hydrator, a portion only of the main or ordinary mixing drum being shown;

Fig. 4 shows an elevation, from the right of Fig. 3, of the chute system employed for the preliminary hydration, and also for the charging of the preliminary hydrating chambers, and the charging of the main mixing chamber; the hydrating chambers and the main mixing chambers being omitted from this figure;

Fig. 5 shows a horizontal section through the chute system of the mixing apparatus on the line $w$—$w$ of Fig. 3, the mixing chambers themselves being omitted;

Fig. 6 shows a vertical section of the chute system on the line $x$—$x$ of Fig. 4;

Fig. 7 shows a fragmentary transverse vertical section of the chute system on the line y—y of Fig. 6, and shows particularly one of the flap valves employed for the control of the discharge of the preliminary hydrating chambers; and Fig. 8 shows an elevation and partial vertical section of the mixing drum and chute system, the view being taken from the left of Fig. 3, and the section being taken through the center of one of the preliminary hydrating chambers.

In the drawings, 1 designates a mixing drum mounted, as is usual, to rotate, and mounted on a suitable truck 2, and provided with a charging skip 3, which is of usual construction except in the respect hereinafter noted, the truck being provided with the usual mechanism 4 for raising and lowering this skip. In Fig. 2 we have indicated in dotted lines the usual engine 5 and a boiler 6 for rotating the drum 1, and for driving the skip-elevating mechanism. The mixing barrel 1 may be of any usual construction, except that at its front end it is provided with a preliminary mixing or hydrating apparatus 7 details of construction of which are shown in Fig. 3, and subsequent figures. Except when specifically so stated, we do not limit ourselves to any particular construction of the drum 1, nor to the direct attachment of the preliminary hydrator to that drum 1, though such direct attachment is preferable; nor to any particular interior construction of the main mixing drum 1, as our invention is applicable to any of the ordinary cement mixers.

The preliminary mixer or hydrator 7 is, in the form shown herein, in general construction a double ball mill, each ball mill thereof being, in a general way, of the construction of simple ball mills such as are commonly employed for the crushing of rock. Such double ball mill comprises two annular ball races 8 and 8ª in which are placed heavy crusher balls 9 or other suitable means whereby, as these ball races are rotated, the materials contained in such ball races will be thoroughly mingled and any lumps which may form will be broken up. The two ball races 8 and 8ª are separated by an annular partition 10 provided with projecting scoops 11 which, as the drum 7 rotates, pick up the fluid or semi-fluid mass within the ball races, and, as each scoop nears the top of the drum, it discharges its contents into one compartment or the other of the double chute 12, the two chute passages of which each conduct such material downward and discharge it slightly laterally in front of the crusher balls 9 of the corresponding ball race 8 or 8ª, as the case may be.

The branch chute 13 leads from one side of the double chute 12 to the interior of the main mixing drum 1; and swinging flap valves 14 are provided between the two channels of chute 12 and this branch chute 13, the valves being arranged as shown in Fig. 7, so that either of these valves may be set at will to cause the material flowing through the corresponding channel of chute 12 to pass into chute 13, and thence into the interior of the main mixing drum 1.

The main mixing drum 1 is provided with the usual charging chute 15 which passes directly through the open central portion of the double ball mill 7 into the interior of the main mixing drum 1. As shown particularly in Fig. 8, two other chutes, 16 and 16ª are provided alongside this chute 15, together with a flap valve 17, which, by its position, determines whether material shall pass down the chute 16, or shall pass down the chute 16ª. The chute 16 discharges into a ball race 8, and the chute 16ª discharges in the ball race 8ª. The ball mill 7 is provided with two spray pipes 18, one arranged to spray water into ball race 8, the other to spray water into ball race 8ª, and a three-way valve 19 is provided whereby water may be turned into the one ball race or the other.

The skip 3 differs from the ordinary skip employed in connection with a concrete mixer, in that it is provided with an internal partition 20 which divides the interior of that skip into two spaces 21 and 22, of which 21 registers when the skip is raised, with the chute 15 leading directly to the interior of the main mixing drum 1; while 22 communicates, in the raised position of this skip, with one or the other of the chutes 16 and 16ª, according to the position of valve 17.

A suitable lever 24 is provided for shifting the flap valve 17 and other suitable levers 25 are provided for shifting the flap valves 14.

The operation according to the preferred manner of carrying out the invention, is as follows:

In starting the mixer in operation, a suitable charge of cement is placed within the portion 22 of the skip, and that skip is raised and the cement discharged into one or the other of the chutes 16 and 16ª, according to the position of the valve 17, and so into one or the other of the ball races 8 and 8ª; and water is at the same time sprayed into the ball race which has thus received a charge of cement without sand or any other aggregate of substantially coarser particles than those of the cement, and preferably the charge in the hydrator should be of cement only. It will be understood that the drum 1, with the attached hydrator 7, is in rotation at the time the charge is received, and that the cement will be hydrated by being forcibly ground in the presence of water. After a minute or so interval a similar charge of cement is delivered in the same manner into the other ball race 8 or 8ª, and water admitted to that second ball race. Rotation is continued for another full interval, generally about one minute, when the skip, with a charge of the aggregate or aggregates such as stone and sand in compartment 21, and a charge of cement in compartment 22, is again raised. Simultaneously with the rising of the skip, the grout mixture in the first-charged ball race is delivered through chute 13 into main drum 1, by setting valve 14. Therefore, when the skip, charged with sand and stone in one compartment, and with cement in the other compartment, has risen to dumping position the sand and stone passes through chute 15 into the main drum, where it is mixed with the prepared grout, which already has had two full periods in the first ball mill; while the cement in compartment 22 passes through chute 16 or 16ª, as the case may be, into the emptied ball mill, where it is met by water, for recharge. From the main drum, after the usual period or interval of mixing, the concrete is delivered by chute 23 in the usual manner. When this is accomplished, the second-charged race, 8 or 8ª, is discharged into the mixing drum, the skip rises, pours sand and stone into 1 and recharges such second-charged race, 8 or 8ª, with cement. This process is repeated indefinitely so long as it is desired to mix concrete.

It will be observed that, in the operation of this apparatus, there is available, for the hydration of each batch of cement, the time during which each batch of cement undergoes treatment in its corresponding hydrating chamber 8 or 8ª (which is almost twice the time occupied in the treatment in the main mixer), plus the time of treatment in the main mixer 1; for hydration continues to some extent during treatment in the main mixer 1 just as in the ordinary method of making concrete. The total time available for the hydration of the cement is therefore about three times or somewhat more than three times the time ordinarily available in the ordinary mixer. Furthermore, the hydration accomplished in the preliminary hydators is much more thorough and complete than can be accomplished where hydration occurs mainly or only in the main mixing chamber, as in the use of the ordinary mixer not provided with preliminary hydrators, for the reasons here mentioned.

As heretofore pointed out, the individual fine particles of cement tend to adhere to form small lumps, and the surface tension of water usually assists in maintaining this lumpy condition of the cement when water is applied to cement, and furthermore, the water, by reason of its surface tension, forms an envelop around these small lumps, with more or less air between the envelop of water and the lump of cement. Furthermore, when cement has water added to it and mixed in the manner heretofore practised, the water seems not to penetrate completely into all of the fine particles of cement and hence fails to completely hydrate these particles and only hydrates the surface of the same. These facts tend to prevent thorough or efficient hydration of cement when mixed with water only, and thorough hydration is rendered more difficult when the main hydration or major portion of the hydration is attempted to be carried out after the cement is mixed with coarser particles such as sand and broken stone, and particularly broken stone, because, as heretofore described, the cement adheres to the broken stone in a very incompletely hydrated condition, and is protected by the irregularities of the stone particles and their larger size, from being readily gotten at to cause their thorough intermingling with water. By hydrating the cement while it is mixed only with the water, the lumpy particles of the cement may be more readily broken up, and by hydrating separate batches in alternation, a greater length of time may be given to the mixing of the water and cement so as to bring about the thorough intermingling of the particles of cement with the water necessary to desirable hydration; and when the cement and water have thus been thoroughly mixed a more intimate and uniform mixture is obtained, which will not segregate as is the case where the cement and water have not been properly mixed before having the coarser particles added.

By the use of the apparatus described herein, the cement may be very thoroughly hydrated. The heavy crusher rollers acting on the wet cement grind any lumps that may have been formed, thus breaking up these lumps and the envelops formed around the same, and grinding the individual particles of the cement, in such manner as to grind these particles which have become wet and partly hydrated, and present additional unhydrated portions of the cement particles, and so on until the mass is reduced to a uniform liquid mixture of cream-like fluidity and consistency, as distinguished from the ununiform, incompletely mixed and readily segregated mixture obtained by present methods. While a very thorough mixing of the cement and water, with the resulting thorough hydration of the cement, is obtained by the use of the apparatus herein shown and described, we do not wish to limit our method of alternately hydrating separate batches of the cement before it is mixed with the coarser aggregates, to the use of the apparatus herein shown. When the liquid hydrated cement is made according to the preferred manner of and apparatus for carrying out our invention, it is of such consistency that when mixed with the coarser aggregate such as broken stone, it is capable of holding the same in suspension and the aggregate may be uniformly coated therewith without interference by pockets or layers of dry cement or films of water without sufficient cement.

It will be obvious to those skilled in the art, after understanding our invention, that the same is susceptible of embodiment in different forms without departing from the spirit or scope of our invention, and that changes in construction, arrangement and design may be made from those herein illustrated and described. Therefore, we do not wish to be understood as limiting ourselves to any particular arrangements or details herein illustrated and described, other than as indicated in the appended claims. So far as certain features of our invention are concerned, any suitable form of hydrator, system of chutes, mixer, or connections between the mixer and hydrators, may be utilized, and we aim in the appended claims to cover all such changes and modifications as are within the spirit and scope of the invention.

By the term "hydrator" used in certain of the following claims, we mean a device capable of making a thorough and intimate mixture of water and cement, such that the cement is well hydrated or united with the water.

In a co-pending application, Serial Number 150367, filed February 23, 1917, we have claimed the process of hydrating the cement, which consists substantially in subjecting the cement while in contact with water, to a heavy grinding action. Therefore, such invention is not claimed herein; the process here claimed being that directed to the mixing of concrete by alternately hydrating separate batches of cement and mixing those hydrated batches successively with portions of coarser aggregates.

Having thus described our invention, what we claim as new and desire to secure by Letters Patent, is:—

1. The method of making concrete, which consists in hydrating separate batches of cement in alternation by continuing the mixing of water and cement of one batch with or without a fine aggregate such as sand, while a mixture of water and cement for another batch with or without a fine aggregate such as sand is being formed, and then adding and mixing the hydrated batches successively to desired portions of other constituents of the concrete, containing the hydration of the cement of one batch while another is being mixed with said other constituents, and so on.

2. The method of making concrete, which consists in hydrating separate batches of cement in alternation by continuing the mixing of water and cement of one batch without an aggregate of coarser particles, while a similar mixture of water and cement for another batch is being formed, and then adding the first batch to a desired portion of the other constituents of the concrete such for example as sand and stone, and mixing this concrete while the hydration of the second batch is continuing, and while this is continuing mixing cement and water to form a third batch for hydration, and then mixing a further desired portion of said other constituents of the concrete with the second batch of hydrated cement while the hydration of the third batch of cement is continuing, and so on.

3. The method of making concrete, which consists in hydrating separate batches of cement in alternation by continuing the mixing of water and cement of one batch while a mixture of water and cement for another batch is being formed, and then adding the first batch to a desired portion of the aggregate of the concrete and mixing this concrete while the hydration of the second batch of cement is continuing, and while this is continuing mixing cement and water to form a third batch for hydration, and then mixing other desired portions of the aggregate of the concrete with the second batch of cement while the hydration of the third batch of cement is continuing, and so on, the duration of the preliminary mixing or hydration of the cement of each batch being equal at least to substantially twice the duration of the mixture of each batch with the aggregate.

4. A concrete mixer comprising, in combination, a main mixer for the mixture of hydrated cement with the aggregates of concrete, a plurality of separate preliminary hydrators capable of receiving a mixture of cement and water and of hydrating the same for a definite period before independent discharge, and means for permitting the discharge of said hydrators into the mixer each without interfering with the hydrating operation of the other.

5. A concrete mixer comprising, in combination, a main mixer adapted to receive and mix hydrated cement and the aggregates of concrete, preliminary cement-hydrating means for the preliminary hydration of the cement, comprising a plurality of ball races with crusher balls therein, the ball races adapted to be rotated, and discharge means for the several ball races adapted to permit the discharge of said races into the main mixer each without interfering with the hydrating operation of the other.

6. A concrete mixer comprising, in combination, a main mixer adapted to receive and mix hydrated cement and the aggregates of concrete, preliminary cement-hydrating means for the preliminary hydration of the cement, comprising a plurality of ball races with crusher balls therein, the ball races adapted to be rotated, and charging and discharging chutes for the several ball races, provided with means whereby the ball races may be charged in alternation and and may be discharged in alternation into the said main mixer.

7. A concrete mixer comprising, in combination, a rotary mixing drum and a preliminary hydrator having means for effecting the mixing of water and cement therein to form grout, said hydrator being arranged to rotate with said drum, means for discharging the grout when formed from said hydrator to said main mixing drum, and means for delivering other concrete-forming constituents to said drum to be mixed therein with said grout mixture.

8. A concrete mixer comprising, in combination, a main mixer and a plurality of separate preliminary hydrators each having means for effecting the mixing of water and cement therein to form grout, and means for charging the hydrators in succession and at intervals and discharging the grout therefrom into the main mixer in succession and at intervals.

9. A concrete mixer comprising, in combination, a main rotary mixer having united with it to rotate with it a plurality of separate preliminary hydrators each having means for effecting the mixing of water and cement therein to form grout, and means for discharging the grout from said hydrators into the main mixer in succession and at intervals.

10. A concrete mixer comprising a main rotary mixer having united with it to rotate with it a preliminary hydrator comprising a plurality of separate hydrators, a charging chute provided with means for admitting a charge to one or another of such separate hydrators at will, and means for discharging the contents of such separate hydrators into the main mixer.

11. A concrete mixer comprising a main rotary mixer having united with it to rotate with it a preliminary hydrator comprising a plurality of separate hydrators, a multiple charging chute for such separate hydrators provided with valve means arranged to direct a charge for such hydrators into one or another of the hydrators at will, and means for discharging the contents of such hydrators into said main mixer.

12. A concrete mixer comprising a main rotary mixer having united with it to rotate with it a preliminary hydrator comprising a plurality of separate hydrators, a multiple charging chute for such hydrators provided with a flap valve arranged to direct a charge for such hydrators into one or another of the hydrators at will, and means for discharging the contents of such hydrators into said main mixer.

13. A concrete mixer comprising, in combination, a rotary main mixer and a separate rotary preliminary hydrator arranged to rotate together, said hydrator comprising a plurality of separate hydrators with means for charging the same and discharging the contents thereof into said main mixer, said hydrators each provided with means for intimately mixing water with cement charged into said hydrator.

14. A concrete mixer comprising, in combination, a rotary main mixer and a separate rotary preliminary hydrator arranged to rotate therewith and comprising a ball mill and means for charging said ball mill with cement and for supplying water thereto and for discharging the contents of said ball mill into the main mixer.

15. A concrete mixer comprising, in combination, a rotary main mixer and a separate rotary preliminary hydrator arranged to rotate therewith and comprising a ball mill arranged to rotate with said mixer, said hydrator having means for charging said ball mill with cement and for supplying water thereto and for discharging the contents of said ball mill into said main mixer.

16. A concrete mixer comprising, in combination, a rotary main mixer and a separate rotary preliminary hydrator arranged to rotate therewith and comprising a plurality of ball mills with means for charging the same in succession with cement and for supplying water thereto and discharging the contents thereof in succession into said main mixer.

17. A concrete mixer comprising, in combination, a main rotary mixer having united with it to rotate with it a preliminary hydrator, a charging chute for the main mixer extending through such hydrator, a charging chute for the hydrator located in proximity to the charging chute for the main mixer, and charging means comprising separate compartments arranged to be brought into connection, the one with the charging chute for the main mixer, the other with the charging chute for the hydrator.

18. A concrete mixer comprising, in combination, a main rotary mixer having united with it to rotate with it a preliminary hydrator, a charging chute for the main mixer extending through such hydrator, a charging chute for the hydrator located in proximity to the charging chute for the main mixer, and charging means arranged to be lowered to receive a charge and to be elevated to discharge such charge, such charging means having separate compartments, one to receive a charge for the mixer, and the other to receive a charge for the hydrator, such compartments arranged to communicate in the raised position of the charging means the one with the charging chute of the main mixer and the other with the charging chute for the hydrator.

19. A concrete mixer comprising, in combination, a main mixer adapted to receive and mix hydrated cement and the aggregates of concrete, preliminary cement-hydrating means for the preliminary hydration of the cement comprising a plurality of separate hydrators each capable of receiving a mixture of cement and water and of hydrating the same before discharge and each having means therein for forcibly grinding the cement while being mixed with the water, and discharge means for the hydrators adapted to permit the discharge of said hydrators into the main mixer each without interfering with the hydrating operation of the other.

In testimony whereof, we have signed our names to this specification.

CLOYD M. CHAPMAN.
NATHAN C. JOHNSON.